United States Patent [19]

Obergfell et al.

[11] Patent Number: 4,473,766
[45] Date of Patent: Sep. 25, 1984

[54] CLOCKWORK STEPPING MOTOR STATOR AND PROCESS FOR MAKING SAME

[75] Inventors: Walter Obergfell; Hans Flaig, both of Schramberg; Robert Wolber, Lauterbach; Max Stubner, Eschbronn, all of Fed. Rep. of Germany

[73] Assignee: Gebruder Junghans GmbH, Schramberg, Fed. Rep. of Germany

[21] Appl. No.: 450,274

[22] Filed: Dec. 16, 1982

[30] Foreign Application Priority Data

Dec. 17, 1981 [DE] Fed. Rep. of Germany ....... 3149995

[51] Int. Cl.³ .............................................. H02K 1/00
[52] U.S. Cl. .............................. 310/216; 310/40 MM; 310/49 R; 310/162; 310/194; 310/254; 336/198
[58] Field of Search .............. 310/40 MM, 49 R, 162, 310/163, 165, 194, 216, 254, 257; 368/157, 160; 336/178, 198

[56] References Cited

U.S. PATENT DOCUMENTS

| | | | |
|---|---|---|---|
| 3,878,414 | 4/1975 | Harakawa | 310/162 |
| 4,066,947 | 1/1978 | Nakajima | 310/49 R |
| 4,206,377 | 6/1980 | Sudler | 310/163 |
| 4,262,353 | 4/1981 | Okazaki | 310/162 |
| 4,324,992 | 4/1982 | Paratte | 310/49 R |

FOREIGN PATENT DOCUMENTS

| | | | |
|---|---|---|---|
| 2509883 | 8/1975 | Fed. Rep. of Germany . | |
| 2559635 | 6/1978 | Fed. Rep. of Germany . | |
| 0026910 | 3/1978 | Japan | 310/49 R |
| 0151073 | 11/1979 | Japan | 310/49 R |
| 0144913 | 11/1979 | Japan | 310/49 R |

Primary Examiner—R. S. Skudy
Attorney, Agent, or Firm—Burns, Doane, Swecker & Mathis

[57] ABSTRACT

A stator comprises a one-piece U-shaped stator sheet having a pair of elongate parallel legs. The legs form pole shoe bridges at their front ends for their reception of a driven motor. At least one of the pole shoe bridges interconnects the legs adjacent their front ends. A coil-carrying bobbin is mounted on one of the legs, the length of the wound coil being longer than its diameter. A separate yoke sheet is fastened to the legs adjacent rear ends thereof to secure the bobbin on the leg. The stator is formed by first stamping-out a stamping which includes the parallel legs and the yoke, with the yoke being integrally attached to the legs by means of webs. After the stamping undergoes the usual pretreatment, the yoke sheet is separated from the legs, whereupon the coil bobbin is slipped onto the leg from the rear. Then, the yoke sheet is secured to the rear ends of the legs to prevent removal of the coil bobbin.

6 Claims, 3 Drawing Figures

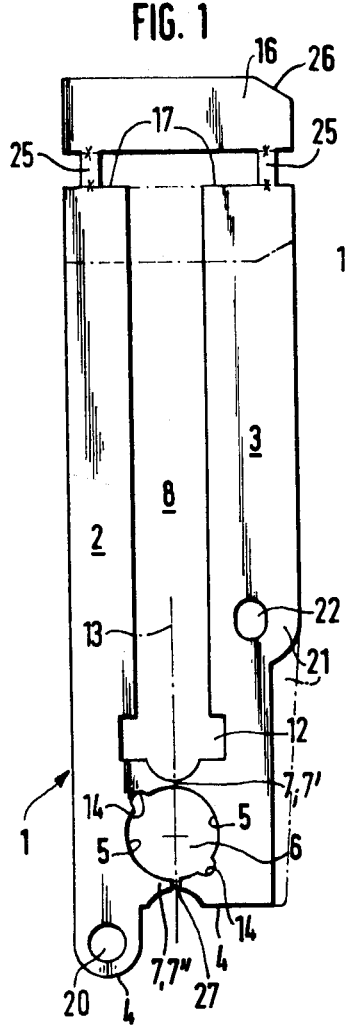
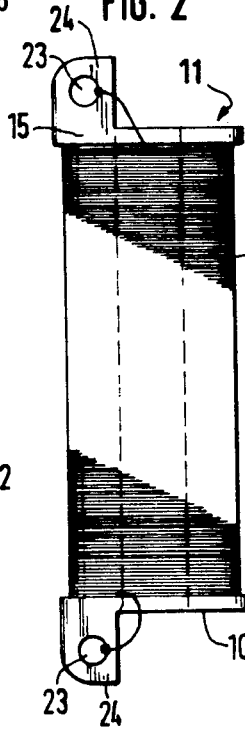
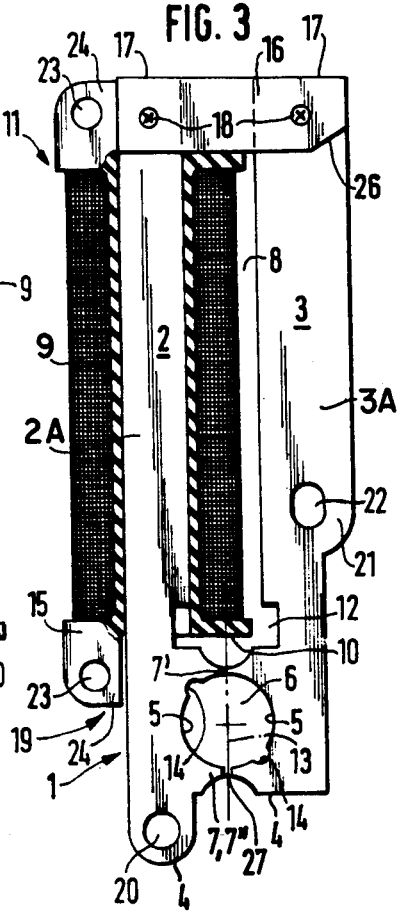

CLOCKWORK STEPPING MOTOR STATOR AND PROCESS FOR MAKING SAME

RELATED APPLICATIONS

Attention is directed to the following copending patent applications in relation to the structure of the stator disclosed herein: U.S. application Ser. No. 06/448,055, filed Dec. 9, 1982 by Gerd Kramer entitled CLOCKWORK STEPPING MOTOR, now abandoned; and U.S. application Ser. No. 06/448,054, filed Dec. 9, 1982 by Roland Maurer et al entitled CLOCK MOVEMENT.

BACKGROUND AND OBJECTS OF THE INVENTION

The invention concerns a clockwork stepping motor stator and a process for making same. The stator is of the type comprising a stator coil and a stator sheet extending through the coil. The stator sheet includes legs integrally joined adjacent their front ends by means of a pole shoe bridge arrangement. The rear ends of the legs are interconnected by means of a yoke sheet which is fastened to the legs.

A clockwork stator of this general type is known from DE-AS 25 59 635. A disadvantage of this stator is that only moderate efficiency of the clockwork stepping motor equipped with such a stator is attained, while a considerable manufacturing effort is required. These disadvantages originate at least to some extent from the fact that an axially short coil bobbin, which consequently must be of large diameter to hold the required coil amount, is molded directly onto a bridge or yoke part of the magnetic circuit. This does not result in optimum magnetic efficiency, since the outer layers of the winding of the stator bobbin contribute substantially less to the magnetization of the core than the inner layers. Furthermore, the use of high speed automatic coil winding machines is made difficult in the case of such a coil bobbin which is already equipped with a stator part. Another particular disadvantage may be that this bridge or yoke part of a multiple part stator sheet may have its magnetic properties affected adversely during the molding of the bobbin as the result of temperature and pressure effects. From a manufacturing standpoint, a disadvantage is that in the case of the known stator, a stator with widely open legs is connected in the area of the pole shoe only by very thin-walled webs bridging-over the rotor opening. These webs are easily broken or at least deformed, whereby the optimum geometry of the stator sheet in the pole shoe is now lost. Also, the mechanical deformation of this thin-walled web area of the magnetic circuit leads to a deterioration of the magnetic properties of the stator sheet exactly in the critical area of the rotor opening; for example, when the free ends of the widely opening U-geometry, after having been distorted in the course of the preceding processing (e.g., heat treating) steps, must be again aligned with the pairs of holes to be screwed to the ends of the bridge or yoke part. Finally, a considerable assembly effort is required in that a supplemental sheet forming an auxiliary pole must be placed in a high predefined position in the area of the rotor opening on the pole shoes of the stator sheet, in order to assure the necessary rotor starting torque in the rotor rotating direction desired.

Fundamentally, the same disadvantages are displayed by the prior art stator known from DE-OS 25 09 883, of a similar generic type and intended for stepping motors in small watches, wherein the starting conditions of the rotor are to be provided by the differently bordered sheets in the pole shoe area of a stator sheet stack.

From DE-AS 25 30 410 a basically similar stator is known, which displays the advantage of using stator coil of a greater length in relation to its diameter because it employs long stator sheet legs essentially parallel to each other. The pole shoes are formed on the frontal ends of the legs, so that a preferred magnetic direction due to a possible grain orientation of the preliminary material may be taken into account and utilized. However, a disadvantage involves the opening geometry in the area of the rotor opening between the pole shoes, which makes it difficult to obtain unambiguous geometrical conditions and the assurance of a geometrically optimum pole shoe range. This difficulty is enhanced by the fact that in order to mount the stator coil on the stator only a very thin stator sheet metal can be considered, because the legs of the U must be bent far apart; return of the legs then to their original geometry is difficult. Furthermore, this known stator requires an additional stator sheet (of different geometry in the pole shoe area) to insure the starting torque and the starting direction of the rotor; this condition, aside from the afore-mentioned problem of returning the bent structure to its initial geometry, requires great care in the mutual locating of the two different profile stator sheets.

In view of these conditions, it is an object of the invention to provide a novel stator and a process for the production of a stator of the above-described type, which may be manufactured simply and manipulated without criticality with respect to its parameters affecting its electromechanical efficiency, and which yields, while using a reduced amount of material, a highly efficient stator with a high reproducibility of its properties, in spite of the mass production of this precision mechanical product.

The object is attained by the present invention which relates to a stator and a process for making same. The stator is of the type comprising a stator coil and a stator sheet extending therethrough. The stator sheet includes legs which are integrally joined adjacent their front ends by means of a pole shoe arrangement. The rear ends of the legs are interconnected by means of a yoke sheet fastened thereto. The process comprises stamping out a plurality of stator parts in the form of a pair of integrally connected parallel legs which are each longer in length than width. The legs define an intermediate space therebetween. The stamp-out further includes a yoke sheet integrally connected to rear ends of the legs opposite the front ends. The legs and yoke are in a generally rectangular arrangement. The yoke sheet is separated from the rear ends of the legs, preferably after an initial treatment of the stamp-out (e.g., a heat treatment step), and thereby rendering the rear end of one of the legs accessible to the reception of the coil bobbin. The coil bobbin is inserted onto that one leg from the rear end thereof without moving the leg relative to one another. The separated yoke sheet is then secured to the legs adjacent their rear ends.

As noted above, another aspect of the present invention relates to the stator itself. The stator comprises a one-piece U-shaped stator sheet comprising a pair of parallel legs which are each longer in length than in width and which define an intermediate space therebetween. The legs form pole shoe bridges at front ends thereof for the reception of a driven rotor. The legs are integrally interconnected adjacent their front ends by one of the pole shoe bridges which extends across the axis of the intermediate space. A coil-carrying bobbin is mounted on one of the legs, with the axis of that bobbin being colinear with such leg so that a portion of the bobbin extends within the intermediate space. The length of the wound coil on the bobbin is longer than its diameter. A separate yoke sheet is fastened to the legs adjacent rear ends thereof to secure the bobbin on the leg and to form a return path for magnetic flux. The yoke sheet is positioned upon surfaces of the legs such that the plane of the yoke sheet is parallel to a plane containing the legs.

A separate aspect of the invention relates to the stator sheet itself which is adapted to receive the coil bobbin.

SUMMARY OF THE INVENTION

The solution according to the invention provides a stator for a clockwork stepping motor of a very high efficiency with a strongly reduced material usage and cost efficient manufacturing conditions, due to the noncritical manipulation of the stamped stator sheet metal. The elongate configuration of the stator with parallel legs provides a stator coil with relatively very thin layers, wherein therefore all of the coil windings contribute optimally to the magnetization of the core, which then may be dimensioned in the form of a relatively thick, single layer stator sheet. By means of the single part (integral), stamped joint of the legs in the pole shoe area, an optimum geometry may be obtained with respect to starting behavior and efficiency. This optimum geometry of the stamped sheet is also maintained by the reinforcement of the legs by the integrally stamped yoke sheet to form a stamping which is stable in its configuration. The optimum geometry is not altered, not even during the subsequent mechanical and heat treatment of the stator sheet stamping or its manipulation in bulk (for example, by vibrating during transportation). The stator coil may be wound separately. In order that the stator sheet may receive same, the aforementioned yoke connection is punched-off parallel to its longitudinal extent, so that the cut yoke defines a yoke sheet, i.e., it has a length corresponding to the width of the stator sheet as measured across the rear ends of both legs. The yoke sheet may be fastened immediately over the legs, adjacent to the rear ends after placement of the prewound coil bobbin. Thus, no mechanical deformation of the stator sheet is required and for this reason a relatively thick (single piece) stator sheet may be employed, the thermally optimized magnetic properties of which (to obtain a high initial permeability and magnetic saturation even with a low flux field strength) are no longer affected in the course of the mounting of the coil. The stability of the closed, frame-like overall configuration (with the simultaneous fixing of the bobbin on the leg) is assured immediately following the placement of the stator coil, by fastening the yoke sheet in the area of the adjacent rear ends of the legs.

Preferably, the yoke sheet is not screwed onto those leg ends, but rather is bonded for example by a fastener such as a contact adhesive or a minature weld, but preferably by means of laser spot welding. This results in a rapidly effected joint that is rigid in displacement and stiff in twisting, having an undetectable effect on the optimized magnetic properties of the sheet and there are no requirements in regard to adjustments (leading to a mechanical deformation of the pole shoe area, as in the case of the alignment of screw holes).

The invention further comprises a stator sheet marketable as a semi-finished product with or without a final treatment, for a stepping motor stator of the aforementioned type.

THE DRAWINGS

Further characteristics and advantages of the invention will become apparent from the description hereinafter of a preferred example of the embodiment of the invention shown with restriction to the essential, but to scale (several times enlarged) in the drawing, such that:

FIG. 1 shows a top view of a stamped stepping motor sheet with the yoke sheet not yet separated;

FIG. 2 is a perspective view of the prewound stator coil bobbin; and

FIG. 3 is a perspective view of the stator ready for installation with the stator coil in place, and the yoke sheet fastened behind it.

DETAILED DESCRIPTION OF A PREFERRED EMBODIMENT OF THE INVENTION

To produce the clockwork stepping motor stator 19, a stator sheet 1 is stamped-out from a relatively thick strip or sheet of the material, as shown in FIG. 1. It has two legs 2, 3 of a length greater than their width. The longitudinal axes of the legs may be oriented, during the alignment of the mill product, under the stamping tool in the direction of a possibly existing magnetically preferred axis of the mill product, which may be provided for example by grain boundary geometries induced during the rolling process.

The legs include longitudinally extending base portions 2A, 3A.

In the vicinity of the front ends 4 of the base portions 2A, 3A on the rotor side, two mutually facing pole shoes 5 are formed which define a generally circular rotor opening 6. By means of narrow pole shoe bridges 7, the pole shoes 5 and thus the legs 2, 3 are integrally connected with each other in the vicinity of their frontal ends 4 on the rotor side. An inner side of each pole shoe bridge 7 forms part of the circular geometry of the rotor opening 6. The outer side of each pole shoe bridge 7 (i.e., the sides facing the frontal leg ends 4 and the intermediate space 8 between the legs) is also in the shape of a circular arc, but with a smaller radius than that defining the rotor opening 6. The width of the pole shoe bridges 7, as measured in the longitudinal direction of the intermediate space 8, is to be as narrow as permitted by the stamping process in view of the prevailing material thickness of the stator sheet 1. This condition assures that these areas of the stator sheet 1 which are greatly narrowed in their cross-section, will, in the case of an increasing magnetic flux generated by the stator winding 9 (FIG. 3) become saturated magnetically very rapidly, while exhibiting approximately the magnetic permeability of an air gap and therefore not acting as a magnetic short circuit around a rotor located in the rotor opening 6, in the case of a continued rise in the magnetic flux. It is desirable to insure that the magnetic field lines, upon their exit from a frontal end (rotor side) 10 of the coil 11 (FIG. 3), do not pass directly to the return leg 3, but rather proceed as completely as possible through the pole shoes 5 and thus through the rotor placed in the rotor opening 6. This is achieved by providing the space 8 with an expansion defined by recesses 12 located in the base portions 2A, 3A adjacently to the rearward pole shoe bridge 7' on the coil side of the opening 6. There thus occurs a corresponding narrowing of the width of the base portions 2A, 3A in a direction transversely to the longitudinal axis 13 extending through the center of the rotor opening 6 and along the center line of the intermediate space 8. Thus, there occurs a displacement of the field in the legs 2, 3 away from the longitudinal axis 13, whereby the desired guidance of the field lines through the pole shoes 5 is effected.

For the stationary angular position of the rotor from the angular position when under flux (corresponding to the passage of the field through the pole shoes 5), in the periphery of the pole shoes 5, two small, semi-circular bays 14, diametrically facing each other are formed. A connecting line between the bays 14 extends at an inclination of approximately 45° with respect to the longitudinal axis of the stator 13, through the center of the rotor opening 6. The angular position of this connecting line with respect to the direction of the passage of the field between the pole shoes 5 determines the direction of rotation of the rotor and is to be optimized as a function of the geometric conditions selected in the individual case to yield the most favorable starting torque of the rotor (see to this extent, utility patent application Ser. No. 06/448,055, filed on Dec. 9, 1982 by Gerd Kramer, and entitled CLOCKWORK STEPPING MOTOR, now abandoned).

Opposite to the frontal ends 4, the intermediate space 8 between the legs must be open or capable of being opened, so that the bobbin 15 equipped with the winding 9 of the stator coil 11 (FIG. 2) may be pushed onto the leg 2. However, the U-shaped stator sheet with the two legs 2, 3 joined together only by the thin pole shoe bridges 7, has a very low mechanical stability and shape retention. That is, during the annealing following the stamping process of the stator sheet 1, deformations may occur, and in the manipulation of the stator sheet 1 between the stamping station and the coil equipment station, for example, in bulk on a vibrating conveyor, there exists a substantial risk that the pole shoe bridges 7 may be bent or broken, especially since it is required that the pole shoes 7 be as thin as possible. If that occurs, the geometry of the stator sheet 1 (for an optimum motor efficiency) is no longer assured, and furthermore the magnetic properties of the annealed stator sheet 1 are affected in areas of strong mechanical stress, such as in the case of a deformation in the vicinity of the pole shoes 5.

The present invention avoids these disadvantages and obtains a stator sheet capable of being handled inexpensively in bulk in the manufacturing process, and preserves the magnetic properties of the stator sheet by the elimination of mechanical deformations. In this regard, the stator sheet 1 is initially stamped-out with a one-piece, integral yoke sheet 16. This yoke sheet 16 is to serve as a connection, relatively rigid against bending, across the rear ends 17 of the legs. The yoke sheet 16, is, in its punched-out state, connected to the rear ends of the legs by means of connecting webs 25. While in this state, the stator sheet, including the yoke is processed, e.g., annealed in the form of this stable structural part, and possibly deburred and straightened. Only after the completion of this processing of the stator sheet 1, i.e., immediately prior to the placing of the stator coil 11 (wound at another station) onto the leg 2, is the intermediate space between the stator rear ends 17 opened. The space is opened by punching through the connecting webs 25. This involves a mechanical stressing of the stator sheet 1 and thus affects its magnetic properties. However, for the efficiency of the stepping motor, this stress is not critical since, due to the small width of the webs 25 as compared with the width of the legs 2, 3, it affects only a small area. Furthermore, such area is located outside of the area of the rotor opening 6 where the magnetic properties of the material and the configuration of the field lines determine the torque of the rotor and the efficiency of the stepping motor.

Following the punching of an opening along the legs 2, 3 toward the intermediate space 8, the coil bobbin 15 (FIG. 2) already pre-equipped with the winding, is pushed onto the leg 2 (FIG. 3). For the fixing of the bobbin 15 on the stator sheet 1 and closing the magnetic circuit, the prestamped yoke sheet 16 is placed over the legs in the area of the rear ends 17 and joined with them (for example, by means of a laser spot welds 18), rigidly in close contact with the surfaces thereof. In order to be able to effect this positioning of the yoke sheet 16 automatically, with the least possible clearance between the legs 2, 3 and the yoke sheet 16 resting upon them, e.g., by means of vibrating conveyors, the yoke sheet 16 is provided with a beveled corner section 26 as a locating aid. It may then be assured by a suitably profiled template that the yoke sheet 16 can be moved onto the legs 2,3 only in such an orientation that its stamping burr is facing away from the stator sheet 1 (upwards). In this manner, the joint assures a small magnetic transition resistance with high mechanical stability. By virtue of the overall shape retaining stability of the stator sheet 1, even between the pole shoes 5, deformations detrimental to efficiency are practically excluded during subsequent handling, such as during the installation of the completed stator 19, consisting of the stator sheet 1 and the coil 11, in a clock movement.

For the positioning of the stator in the clock movement, for example on pins molded onto a bottom plate also supporting the rotor, the frontal end 4 of the coil-carrying leg 2 projecting over the area of the rotor opening 6 is equipped with a locating lug 20 (FIG. 1). To absorb the moment opposing the motion of the rotor, the leg 3 has an elongated slot 22 in a laterally expanded portion 21, which is engaged by an additional holding pin during the installation of the stator 19. To secure the stator 19 in the direction of the pins, bolts 23 are provided; they are anchored, preferably molded, in the projecting bobbin flanges 24, and extend transversely to the longitudinal direction of the coil 11.

The elongate geometry of the stator sheet 1, with a rotor opening 6 located in the area in front of the front end 10 of the coil, makes it possible to design a stator sheet 11 very long in relation to its diameter. Thus, the electromagnetic efficiency of the stepping motor is very good, since all of the windings of the winding 9 are located close to the coil core in the form of the stator leg 2 and thus are contributing in an approximately equal degree to magnetization. It is, therefore, sufficient to design the stator 19 in a single layer, i.e., as a single relatively thick stator sheet 1, which yields the advantage of considerable savings in processing and material, compared with conventional thin, multilayer stator layouts. This is supplemented by the feasibility of cost effective manipulation with only the slightest risk of a deterioration of the functional properties of the single-piece, frame-like stamped piece stator sheet 1 upon mounting of the stator coil 11 and the shape retaining application of the yoke connector. The geometry of the stator sheet in the area of the pole shoes 5 is maintained, so that a stator 19 of high electromagnetic efficiency is obtained under cost effective manufacturing conditions.

As shown in the drawing (FIG. 1), the projections in the geometry of the stator sheet 1 (to form the locating lug 20 and the elongated support hole 22) are rounded so that during bulk handling, especially on vibration conveyors, no agglomerations are formed or other slow-downs occur. The leg 3, widened to accommodate the elongated hole 22, may alternatively have a continuous width geometry or a straight line border (broken line in FIG. 1), if such a geometry is compatible with the installation conditions in view of the clock movement spatially following this assembly (gear and hands movements).

The drawing also discloses that it is sufficient to close one of the two pole shoe bridges 7, while the other, preferably the forward pole shoe 7″ farthest from the coil, has a slot 27 aligned with the longitudinal axis 13 of the stator. It was discovered surprisingly that such a very narrow slot 27 may be formed (by stamping or sawing, for example) even after the heat treatment of the stator sheet 1, i.e., after the mechanical stiffening of the stator frame by the mounting of the prestamped yoke sheet 16 in the rear, without thereby affecting the efficiency of the stator. On the other hand, the application of the narrow slot 27 has the advantage that by the removal of material, a fine adjustment of the electromagnetic effects in the area of the pole shoes 5 is possible.

Although the present invention has been described in connection with a preferred embodiment thereof, it will be appreciated by those skilled in the art that additions, modifications, substitutions, and deletions not specifically described, may be made, without departing from the spirit and scope of the invention, as defined in the appended claims.

What is claimed is:

1. A stator comprising:
   a one piece U-shaped stator element comprising a pair of legs, each leg including:
      a longitudinally extending base portion which is longer in length than in width, said base portions being spaced transversely to define an intermediate space therebetween, and
      forward and rearward pole shoe bridges extending transversely from front ends of said base portions, said forward and rearward pole shoe bridges being mutually spaced in a direction parallel to longitudinal axes of said base portions and defining therebetween a rotor opening for the reception of a driven rotor, the center of said opening being disposed between the longitudinal axes of said base portions, said base portions being integrally interconnected adjacent said front ends by one of said pole shoe bridges which extends across said intermediate space,
   a coil-carrying bobbin mounted on one of said base portions, with the longitudinal axis of said bobbin being colinear with the longitudinal axis of said one base portions such that a portion of said bobbin is disposed within said intermediate space, the length of a coil wound on said bobbin being longer than the coil diameter, and
   a yoke welded to said base portions adjacent rear ends thereof to secure said bobbin on said one base portion and to form a return path for magnetic flux, said yoke being positioned upon front-to-rear extending surfaces of said base portions such that the plane of said yoke is parallel to a plane containing said base portions, each of said base portions including a recess disposed immediately rearwardly of said rearward pole shoe bridge and adjacent a forward end of said coil bobbin, said recesses facing one another transversely to define a widening of said intermediate space between said base portions for resisting the travel of magnetic flux from said one leg to the other of said legs rearwardly of said rearward pole shoe bridge, said recesses terminating rearwardly of said front end of said coil bobbin to narrow said space between said base portions.

2. A stator according to claim 1, wherein said rearward pole shoe bridge includes a semi-circular edge facing said intermediate space.

3. A stator according to claim 1, wherein said one base portion includes an extension beyond the other base portion, and a lug formed on said extension including a lug for positioning the stator in a support.

4. A stator according to claim 3, wherein said other base portion includes a widened portion in which there is disposed a mounting slot located generally diametrically from said lug across a circular rotor hole formed by said pole shoes.

5. A stator according to claim 1, wherein said forward pole shoe bridge is interrupted by a slot aligned with a horizontal axis of the stator.

6. A stator sheet adapted to receive a coil-carrying bobbin for use as a clockworks driving source, said stator sheet being of U-shaped configuration comprising a pair of parallel legs, each leg including a longitudinally extending base portion which is longer in length than in width, said base portions being spaced transversely to define an intermediate space therebetween, said legs forming forward and rearward pole shoe bridges at front ends thereof for the reception of a driven rotor, said legs being integrally interconnected adjacent said front ends by one of said pole shoe bridges which extends across said intermediate space, and a separate yoke fastened by fastening means to said base portions adjacent rear ends thereof to secure said rear ends together to form a return path for magnetic flux, said yoke being adapted to retain a coil bobbin installed on one of said base portions, each of said base portions including a recess disposed immediately rearwardly of said rearward pole shoe bridge, said recesses facing one another transversely to define a widening of said intermediate space between said base portions for resisting the travel of magnetic flux from said one leg to the other of said legs rearwardly of said rearward pole shoe bridge.

* * * * *